United States Patent Office 2,990,388
Patented June 27, 1961

2,990,388
ALLYLIC RESIN COMPOSITION AND PROCESS
Christian W. Johnston, Belle Mead, and Daniel Warren, New Brunswick, N.J., assignors to Food Machinery and Chemical Corporation, New York, N.Y., a corporation of Delaware
No Drawing. Filed Feb. 20, 1959, Ser. No. 794,516
9 Claims. (Cl. 260—23)

This invention relates to novel resinous compositions, particularly allylic phthalate resin compositions for molding and laminating applications, and to a method of improving the curing conditions and cured properties of these compositions.

It is known that allylic phthalates may be polymerized to form resins having excellent mechanical, thermal and electrical properties. In so doing, allylic phthalates are conveniently formulated as "prepolymer" compositions, which are partially polymerized thermoplastic solids of relatively low molecular weight, characterized by residual unsaturation and thus capable of further cure to thermoset resins. Among other advantages which accompany the use in formulations of allylic phthalate prepolymers is that, in applications such as molding, casting and laminating, the prepolymer is not subject to significant shrinkage on final cure, thus preserving the shape and surface of the article fabricated. Polyallylic phthalates also tend to adhere tenaciously to metal surfaces—a desirable property in such applications as the plotting of electrical components.

But the above advantages of non-shrinkage and adhesion, inherent in the resin, are accompanied by the practical disadvantage that the resin also adheres tenaciously to the mold or caul in which it is cured. A means of obtaining ready release from metal surfaces of the molded or laminated product, without damaging the surface of the resin, is required.

It is known that many types of substances, called mold release or parting agents, can be used to facilitate separation of cured resins from the metallic surfaces of the molds or cauls in which they are prepared. These release agents are used in either of two ways, depending on the resin involved and the particular problems encountered. The release agent may either be incorporated directly into the plastic formulation as an "internal" release agent, or it may be used externally as a coating for the metallic surfaces of the mold or caul. Internal release agents are generally preferred, since the step of coating the mold or caul is eliminated. Through use of an effective release agent, processing rates are increased and smooth resinous surfaces are obtained. A large variety of substances, such as waxes, oils, greases, soaps, fatty acids, alcohols and esters, have been used as release agents for many different resins. These release agents are highly specific in their application. Thus, fatty acids, their salts and esters are preferred for use with polyvinyl chloride, certain fatty esters are recommended for epoxy resins, others for polystyrene, and so on. There is no universal mold release agent, and agents which are quite effective with some resins may be virtually useless with others. Heretofore, no adequate internal release agent for use with diallylic phthalate resins has been available; in fact, many of the commonly used release agents have actually strengthened adhesion between the resin and the mold, or prolonged the cure cycle of the resin.

An object of this invention is to provide a method of obtaining the rapid release of cured diallylic phthalate polymer compositions from molds and cauls.

A further object is to provide a method for improving the fluidity and molding characteristics of diallylic phthalate prepolymer formulations.

A further object is to provide a method for accelerating the cure of diallylic phthalate formulations.

Another object is to provide a cured diallylic phthalate polymer having improved heat distortion temperatures, hardness and other properties.

These and other objects are accomplished as described below.

We have discovered that, when diallylic phthalate prepolymers are formulated with a small amount of lauric acid as in internal release agent, release of the cured resin from the mold or caul is rapidly and efficiently achieved, with the complete elimination of sticking. This is in marked contrast with results obtained using other internal release agents.

We have also discovered that lauric acid in the polydiallylic phthalate formulation has the additional unexpected property of markedly accelerating the final cure of the prepolymer, providing substantial advantages for large-scale commercial production. Not only is the rate of cure faster, but the mechanical properties of the cured products are improved over those not containing lauric acid.

Further, the inclusion of even a small amount of lauric acid in the prepolymer formulation lowers its viscosity, resulting in more efficient penetration in molds and laminates. This improved fluidity also results in better heat transfer, and may contribute to the faster cure and the improved mechanical and electrical properties of the cured product.

In addition to the above advantages, lauric acid is soluble at ordinary temperatures in the solvents normally used in laminate impregnation, thus facilitating use in this application. No external release agent need be used on the cauls, nor the cellophane parting sheet which is commonly used to prevent sticking to the cauls. When lauric acid is employed as an internal lubricant as described herein, the laminate is readily released from the metal, and the surface of the laminate is characterized by high clarity and gloss.

The diallylic phthalate polymer compositions used in this invention may be derived from ortho-, iso- and terephthalic acids, and hydrogenated derivatives thereof. The esterifying groups may be allyl, methallyl, and mixtures thereof. The diallylic phthalate polymers may be modified by copolymerization with other allyl or vinyl compounds, to prepare products having specific properties. These allylic phthalates are preferably formulated as thermoplastic prepolymers, as stated above. These prepolymers are relatively linear, partially polymerized diallylic phthalates. They soften and flow under heat and pressure, as in molding and laminating, and crosslink to a three-dimensional insoluble thermoset resin during curing. Unlike many other thermosetting resins, they undergo a vinyl type polymerization in the presence of a peroxide catalyst.

These prepolymers may be prepared by methods well known in the art, such as those described in U.S. Patent No. 2,273,891. The diallylic phthalate is polymerized under controlled conditions to a low molecular weight, thermoplastic polymer, which contains residual unsaturation. A peroxide catalyst is generally used, and the reaction is stopped at the desired point by such methods as quenching the reactants, lowering the temperature, or employing a chain-termination or chain-transfer agent. The prepolymer produced is a thermoplastic solid, solube in low molecular weight ketones, benzene and ethyl acetate, and insoluble in water and alcohols.

The prepolymer is then formulated, and cured in situ to a thermoset resin. For example, a typical formulation for use in the instant invention would include the prepolymer, usually a small amount of a monomer, a peroxide catalyst, lauric acid, and any filler, colorant, inhibitor, reinforcing agent, or other additive. The monomer may be the same diallylic phthalate as the prepolymer, or any other mono- or polyunsaturated allyl or vinyl monomer, selected to impart particular properties to the product. The amount of monomer included in the formulation varies somewhat with the processing procedure and the desired composition of the final product. In molding compositions, for example, less than about fifteen percent monomer, by weight of prepolymer, is usually used since the product tends to become tacky as the amount of monomer is increased. In preparing laminates, which are impregnated from solution, larger amounts of monomers may be included, and in fact it is sometimes desired, for hand layups, that the uncured laminate be tacky after evaporation of the solvent.

The lauric acid release agent is incorporated directly into the formulation. Pure lauric acid may be used, or commercial products which contain other fatty acids as well. Commercial lauric acid is a mixture of saturated fatty acids with an average chain length of twelve carbon atoms, and usually contains over eighty percent pure lauric acid. An economical source of lauric acid, usable in the instant invention, is coconut fatty acid, which is about half pure lauric acid, the remainder being a scattering of other fatty acids having an average chain length of about twelve carbon atoms. The lauric acid (including any related fatty acids present) is preferably used in at least about 0.5 percent by weight of resin—that is, by weight of prepolymer plus monomer. Excellent results are obtained with 1 to 3 percent of lauric acid. There is generally no advantage to exceeding about 5 percent lauric acid, by weight of resin, in the formulation.

The peroxide catalyst in the formulation is preferably an organic peroxide, for compatibility. Common organic peroxides include perbenzoate esters, benzoyl peroxide, tert-butyl hydroperoxide, and the like. Many others can be used, usually in amounts of about 0.5 to 5 percent by weight of resin. If desired, an inhibitor may be used to prevent premature curing. Curing is generally carried out at temperatures of about 250 to 350° F. and at pressures up to about 10,000 p.s.i., although conditions outside these ranges may be used. Curing is rapid, and release from the molds or laminate cauls is immediate.

The usual proportion of filler to resin in molding compositions may vary from less than one half to over one and one half the weight of the resin, depending on the properties desired in the product; other additives or reinforcing agents may be included as desired.

In laminating compositions, the prepolymer, monomer, catalyst, lauric acid, and any desired additive such as a dye or inhibitor are dissolved in an appropriate solvent, the filler sheets are impregnated, and the solvent is evaporated. Final cure may be effected according to standard laminating procedures.

The following examples illustrate formulations of various allylic phthalates with lauric acid. These examples are not to be construed as limiting the invention:

Example 1

The following formulation was blended on compounding rolls:

| | Parts |
|---|---|
| Diallyl orthophthalate prepolymer | 95 |
| Diallyl orthophthalate monomer | 5 |
| t-Butyl perbenzoate | 3 |
| Lauric acid | 2 |
| Calcium carbonate filler | 80 |
| Titanium dioxide—calcium sulfate filler | 70 |
| Chrome yellow | 3.2 |

The composition was molded in a 4" disk mold. Curing was carried out for 2 minutes at 300° F. at 8000 p.s.i. The disk released immediately from the mold, with a hard, glossy surface. The heat distortion point of the product was 266° F.

For comparison, an identical molding was prepared, replacing the lauric acid in the formulation with zinc stearate, and curing for 2 minutes at 300° F. The sample stuck in the mold after curing, and could not be removed without damaging the sample. The heat distortion point of the product was 176° F., substantially lower than the 266° F. obtained using lauric acid.

When samples identical with the above were cured for 4 minutes at 300° F., the lauric acid sample had a heat distortion point of 310° F., whereas the zinc stearate not only stuck in the mold, but had a heat distortion point of only 262° F. Thus, even at longer cure times, the beneficial effect of the lauric acid on the thermal stability and rate of cure of the product is apparent.

Example 2

A solution of diallyl orthophthalate prepolymer for laminating applications was prepared according to the following formulation:

| | Parts |
|---|---|
| Diallyl orthophthalate prepolymer | 97 |
| Diallyl orthophthalate monomer | 3 |
| Lauric acid | 3 |
| t-Butyl perbenzoate | 3 |
| Methyl isobutyl ketone | 95 |

Through this solution were passed alpha-cellulose papers, until impregnated. The solvent was evaporated, and the papers were laminated to Masonite board at 300° F. and 350 p.s.i. for 15 minutes in a press. The cured laminate released immediately from the cauls. The laminate had a glossy, even surface and high clarity.

For comparison, a laminate was prepared, identical to the above but omitting the lauric acid from the formulation. Carnauba wax was used on the cauls as an external mold release agent. The surface of the cured laminate stuck to the caul plates, and was spotted and hazy. This sticking to the cauls could be eliminated only by the use of large excesses of carnauba wax.

Example 3

The following formulation was blended on compounding rolls:

| | Parts |
|---|---|
| Dimethallyl isophthalate prepolymer | 90 |
| Diallyl isophthalate monomer | 10 |
| t-Butyl perbenzoate | 3 |
| Lauric acid | 2 |
| Silica filler | 100 |

The composition was molded in a 4" disk mold, and cured for 2 minutes at 300° F. and 8,000 p.s.i. The disk released immediately from the mold, and had a smooth, hard surface. The product had a heat distortion point of over 450° F., a flexural strength of 7500 p.s.i. and a compressive strength of 22,000 p.s.i.

Example 4

A molding powder was compounded as follows:

| | Parts |
|---|---|
| Dimethallyl orthophthalate prepolymer | 100 |
| t-Butyl perbenzoate | 3 |
| Lauric acid | 3 |

The composition was molded in a 4" disk, and cured for 12 minutes at 300° F. and 8,000 p.s.i. The product released immediately from the mold, and had a heat distortion point of 273° F., a Rockwell hardness (M scale) of 115, and a flexural strength of 7,100 p.s.i.

Example 5

A laminate was prepared as follows:

| | Parts |
|---|---|
| Diallyl isophthalate prepolymer | 93 |
| Diallyl isophthalate monomer | 7 |
| t-Butyl perbenzoate | 2 |
| Coconut oil fatty acid | 2 |
| Methyl isobutyl ketone | 95 |

A solution of the above components was prepared, and alpha-cellulose papers were impregnated. The solvent was evaporated, and the papers were laminated to wood particle board at 310° F. and 250 p.s.i. for 8 minutes. The cured laminate released immediately, and had a hard, clear, glossy surface.

Example 6

A laminating solution was prepared as follows:

| | Parts |
|---|---|
| Diallyl hexahydrophthalate prepolymer | 95 |
| Diallyl orthophthalate monomer | 5 |
| Benzoyl peroxide | 3 |
| Lauric acid | 1 |
| Methyl isobutyl ketone | 95 |

Alpha-cellulose papers were impregnated with this solution. The solvent was evaporated, and the papers were laminated to cement asbestos board at 285° F. and 600 p.s.i. for 18 minutes. The product released immediately from the cauls, and had a hard, clear, abrasion resistant surface.

Example 7

The following formulation was blended on compounding rolls:

| | Parts |
|---|---|
| Dimethallyl tetrahydrophthalate prepolymer | 95 |
| Dimethallyl tetrahydrophthalate monomer | 5 |
| t-Butyl perbenzoate | 3 |
| Lauric acid | 2 |
| Calcium carbonate filler | 50 |
| Phthalocyanine blue | 1 |

The composition was molded in a 4" disk mold, and cured for 22 minutes at 300° F. and 8,000 p.s.i. The disk released immediately from the mold, with a hard, glossy surface. The heat distortion point of the product was 392° F. The heat distortion point in this and the preceding examples was determined according to ASTM test D-648-56, at 264 p.s.i. fiber stress. Standard ASTM tests were also employed for measuring the other physical properties reported.

It is apparent that this invention is susceptible to numerous modifications within the scope of the disclosure, and it is intended to include such variations within the scope of the following claims.

We claim:

1. A thermoplastic resinous composition capable of polymerization to a thermoset resin characterized by ready release from metallic surfaces, comprising a partially polymerized diallylic ester of a phthalic acid and, incorporated with said composition as an internal release agent, 0.5 to 5 percent of lauric acid.

2. A thermoplastic resinous composition capable of polymerization to a thermoset resin characterized by ready release from metallic surfaces, comprising a thermoplastic polymer of diallyl orthophthalate and, incorporated with said composition as an internal release agent, 0.5 to 5 percent of lauric acid.

3. A thermoplastic resinous composition capable of polymerization to a thermoset resin characterized by ready release from metallic surfaces, comprising a thermoplastic polymer of dimethallyl orthophthalate and, incorporated with said composition as an internal release agent, 0.5 to 5 percent of lauric acid.

4. A thermoplastic resinous composition capable of polymerization to a thermoset resin characterized by ready release from metallic surfaces, comprising a thermoplastic polymer of diallyl isophthalate and, incorporated with said composition as an internal release agent, 0.5 to 5 percent of lauric acid.

5. A thermoplastic resinous composition capable of polymerization to a thermoset resin characterized by ready release from metallic surfaces, comprising a thermoplastic polymer of dimethallyl isophthalate and, incorporated with said composition as an internal release agent, 0.5 to 5 percent of lauric acid.

6. A thermoplastic resinous composition capable of polymerization to a thermoset resin characterized by ready release from metallic surfaces, comprising a thermoplastic polymer of a diallylic tetrahydrophthalate and, incorporated with said composition as an internal release agent, 0.5 to 5 percent of lauric acid.

7. A thermoplastic resinous composition capable of polymerization to a thermoset resin characterized by ready release from metallic surfaces, comprising a thermoplastic polymer of a diallylic hexahydrophthalate and, incorporated with said composition as an internal release agent, 0.5 to 5 percent of lauric acid.

8. A method of obtaining immediate release from contact with metallic surfaces of a resinous composition comprising a thermoset polymer of a diallylic phthalate, including the steps of (a) combining with a thermoplastic polymer of said diallylic phthalate 0.5 to 5 percent of lauric acid, and (b) curing said thermoplastic polymer while in contact with metallic surfaces to form said thermoset polymer.

9. A thermoset resinous composition characterized by ready release from metallic surfaces, comprising a thermoset polymer of a diallylic phthalate and, incorporated therein, 0.5 to 5 percent, by weight of said polymer, of lauric acid.

References Cited in the file of this patent

UNITED STATES PATENTS

| 2,377,095 | Muskat | May 29, 1945 |
| 2,462,331 | Myers | Feb. 22, 1949 |
| 2,832,758 | Heiberger et al. | Apr. 29, 1958 |